(12) United States Patent
Kondrad et al.

(10) Patent No.: US 9,315,130 B2
(45) Date of Patent: Apr. 19, 2016

(54) ARTICULATING HEAD RESTRAINT

(71) Applicant: Ford Global Technologies, LLC, Dearborn, MI (US)

(72) Inventors: Marc Kondrad, Macomb Township, MI (US); Johnathan Andrew Line, Northville, MI (US); Gunnar Groesbeck, Berkley, MI (US); Yalie Yan-rush, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 14/076,893

(22) Filed: Nov. 11, 2013

(65) Prior Publication Data
US 2015/0130247 A1    May 14, 2015

(51) Int. Cl.
*A47C 7/36* (2006.01)
*B60N 2/48* (2006.01)

(52) U.S. Cl.
CPC .............. *B60N 2/4864* (2013.01); *B60N 2/482* (2013.01); *B60N 2/4829* (2013.01)

(58) Field of Classification Search
CPC .. B60N 2/4805; B60N 2/4808; B60N 2/4864; B60N 2/4867; B60N 2/482; B60N 2/4829
See application file for complete search history.

(56) References Cited

U.S. PATENT DOCUMENTS

| | | |
|---|---|---|
| 2,958,369 A | 11/1960 | Pitts et al. |
| 3,403,938 A | 10/1968 | Cramer et al. |
| 3,592,508 A | 7/1971 | Druseikis |
| 3,885,831 A | 5/1975 | Rasmussen |
| 3,929,374 A | 12/1975 | Hogan et al. |
| 4,324,431 A | 4/1982 | Murphy et al. |
| 4,334,709 A | 6/1982 | Akiyama et al. |
| 4,353,595 A | 10/1982 | Kaneko et al. |

(Continued)

FOREIGN PATENT DOCUMENTS

| | | |
|---|---|---|
| DE | 3519351 | 12/1986 |
| EP | 0754590 | 1/1997 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — Philip Gabler
(74) *Attorney, Agent, or Firm* — Vichit Chea; Price Heneveld LLP

(57) ABSTRACT

A head restraint includes a base bracket with support posts that are configured to easily engage a seatback during vehicle assembly and to provide an electrical connection for adjustment actuation of the head restraint. A front link and a rear link pivotally couple with an upper portion of the seatback. A head support member is pivotally coupled with the front and rear links to define a four-bar linkage. The head support member is moveable between fore and aft positions via the front and rear links. A cushion is slidably coupled with a base portion of the head support member and is thereby moveable between upper and lower positions. Separate actuators are contained within a trim enclosure of the head restraint to effectuate adjustments of the cushion between fore and aft positions and upper and lower positions.

20 Claims, 12 Drawing Sheets

(56) References Cited

U.S. PATENT DOCUMENTS

| | | |
|---|---|---|
| 4,541,669 A | 9/1985 | Goldner |
| 4,629,248 A | 12/1986 | Mawbey |
| 4,720,141 A | 1/1988 | Sakamoto et al. |
| 4,915,447 A | 4/1990 | Shovar |
| 5,171,062 A | 12/1992 | Courtois |
| 5,174,526 A | 12/1992 | Kanigowski |
| 5,222,784 A | 6/1993 | Hamelin |
| 5,518,294 A | 5/1996 | Ligon, Sr. et al. |
| 5,560,681 A | 10/1996 | Dixon et al. |
| 5,647,635 A | 7/1997 | Aumond et al. |
| 5,755,493 A | 5/1998 | Kodaverdian |
| 5,769,489 A | 6/1998 | Dellanno |
| 5,826,938 A | 10/1998 | Yanase et al. |
| 5,836,648 A | 11/1998 | Karschin et al. |
| 5,902,014 A | 5/1999 | Dinkel et al. |
| 5,913,568 A | 6/1999 | Brightbill et al. |
| 5,951,039 A | 9/1999 | Severinski et al. |
| 6,024,406 A | 2/2000 | Charras et al. |
| 6,062,642 A | 5/2000 | Sinnhuber et al. |
| 6,145,925 A | 11/2000 | Eksin et al. |
| 6,155,593 A | 12/2000 | Kimura et al. |
| 6,179,379 B1 | 1/2001 | Andersson |
| 6,189,966 B1 | 2/2001 | Faust et al. |
| 6,196,627 B1 | 3/2001 | Faust et al. |
| 6,206,466 B1 | 3/2001 | Komatsu |
| 6,217,062 B1 | 4/2001 | Breyvogel et al. |
| 6,220,661 B1 | 4/2001 | Peterson |
| 6,224,150 B1 | 5/2001 | Eksin et al. |
| 6,296,308 B1 | 10/2001 | Cosentino et al. |
| 6,312,050 B1 | 11/2001 | Eklind |
| 6,364,414 B1 | 4/2002 | Specht |
| 6,375,269 B1 | 4/2002 | Maeda et al. |
| 6,394,546 B1 | 5/2002 | Knoblock et al. |
| 6,454,353 B1 | 9/2002 | Knaus |
| 6,523,892 B1 | 2/2003 | Kage et al. |
| 6,550,856 B1 | 4/2003 | Ganser et al. |
| 6,565,150 B2 | 5/2003 | Fischer et al. |
| 6,619,605 B2 | 9/2003 | Lambert |
| 6,682,140 B2 | 1/2004 | Minuth et al. |
| 6,695,406 B2 | 2/2004 | Plant |
| 6,698,832 B2 | 3/2004 | Boudinot |
| 6,719,373 B2 * | 4/2004 | Zimmermann ............... 297/410 |
| 6,736,452 B2 | 5/2004 | Aoki et al. |
| 6,758,522 B2 | 7/2004 | Ligon, Sr. et al. |
| 6,808,230 B2 | 10/2004 | Buss et al. |
| 6,824,212 B2 | 11/2004 | Malsch et al. |
| 6,848,742 B1 | 2/2005 | Aoki et al. |
| 6,860,559 B2 | 3/2005 | Schuster, Sr. et al. |
| 6,860,564 B2 | 3/2005 | Reed et al. |
| 6,866,339 B2 | 3/2005 | Itoh |
| 6,869,140 B2 | 3/2005 | White et al. |
| 6,890,029 B2 | 5/2005 | Svantesson |
| 6,938,953 B2 | 9/2005 | Håland et al. |
| 6,955,399 B2 | 10/2005 | Hong |
| 6,962,392 B2 | 11/2005 | O'Connor |
| 6,988,770 B2 | 1/2006 | Witchie |
| 6,997,473 B2 | 2/2006 | Tanase et al. |
| 7,040,699 B2 | 5/2006 | Curran et al. |
| 7,100,992 B2 | 9/2006 | Bargheer et al. |
| 7,131,694 B1 | 11/2006 | Buffa |
| 7,159,934 B2 | 1/2007 | Farquhar et al. |
| 7,185,950 B2 | 3/2007 | Pettersson et al. |
| 7,213,876 B2 | 5/2007 | Stoewe |
| 7,229,118 B2 | 6/2007 | Saberan et al. |
| 7,261,371 B2 | 8/2007 | Thunissen et al. |
| 7,344,189 B2 | 3/2008 | Reed et al. |
| 7,350,859 B2 | 4/2008 | Klukowski |
| 7,393,005 B2 | 7/2008 | Inazu et al. |
| 7,425,034 B2 | 9/2008 | Bajic et al. |
| 7,441,838 B2 | 10/2008 | Patwardhan |
| 7,467,823 B2 | 12/2008 | Hartwich |
| 7,478,869 B2 | 1/2009 | Lazanja et al. |
| 7,506,924 B2 | 3/2009 | Bargheer et al. |
| 7,506,938 B2 | 3/2009 | Brennan et al. |
| 7,530,633 B2 | 5/2009 | Yokota et al. |
| 7,543,888 B2 * | 6/2009 | Kuno ............................ 297/353 |
| 7,578,552 B2 | 8/2009 | Bajic et al. |
| 7,597,398 B2 | 10/2009 | Lindsay |
| 7,604,294 B2 * | 10/2009 | Jane Santamaria ........ 297/250.1 |
| 7,614,693 B2 | 11/2009 | Ito |
| 7,640,090 B2 | 12/2009 | Uchida et al. |
| 7,641,281 B2 | 1/2010 | Grimm |
| 7,669,928 B2 | 3/2010 | Snyder |
| 7,712,833 B2 | 5/2010 | Ueda |
| 7,717,459 B2 | 5/2010 | Bostrom et al. |
| 7,726,733 B2 | 6/2010 | Balser et al. |
| 7,735,932 B2 | 6/2010 | Lazanja et al. |
| 7,753,451 B2 | 7/2010 | Maebert et al. |
| 7,775,602 B2 | 8/2010 | Lazanja et al. |
| 7,784,863 B2 | 8/2010 | Fallen |
| 7,794,012 B2 | 9/2010 | Szablewski |
| 7,802,843 B2 | 9/2010 | Andersson et al. |
| 7,819,470 B2 | 10/2010 | Humer et al. |
| 7,823,971 B2 | 11/2010 | Humer et al. |
| 7,845,729 B2 * | 12/2010 | Yamada et al. ............. 297/284.1 |
| 7,857,381 B2 | 12/2010 | Humer et al. |
| 7,862,117 B2 * | 1/2011 | Hutchinson et al. ........ 297/256.1 |
| 7,871,126 B2 | 1/2011 | Becker et al. |
| 7,891,701 B2 | 2/2011 | Tracht et al. |
| 7,909,360 B2 | 3/2011 | Marriott et al. |
| 7,931,294 B2 | 4/2011 | Okada et al. |
| 7,931,330 B2 | 4/2011 | Itou et al. |
| 7,946,649 B2 | 5/2011 | Galbreath et al. |
| 7,963,553 B2 | 6/2011 | Huynh et al. |
| 7,963,595 B2 | 6/2011 | Ito et al. |
| 7,963,600 B2 | 6/2011 | Alexander et al. |
| 7,971,931 B2 | 7/2011 | Lazanja et al. |
| 7,971,937 B2 | 7/2011 | Ishii et al. |
| 8,011,726 B2 | 9/2011 | Omori et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,075,053 B2 | 12/2011 | Tracht et al. |
| 8,109,569 B2 | 2/2012 | Mitchell |
| 8,123,246 B2 | 2/2012 | Gilbert et al. |
| 8,128,167 B2 | 3/2012 | Zhong et al. |
| 8,162,391 B2 | 4/2012 | Lazanja et al. |
| 8,162,397 B2 | 4/2012 | Booth et al. |
| 8,167,370 B2 | 5/2012 | Arakawa et al. |
| 8,201,883 B2 | 6/2012 | Wuerstlein et al. |
| 8,210,568 B2 | 7/2012 | Ryden et al. |
| 8,210,605 B2 | 7/2012 | Hough et al. |
| 8,210,611 B2 | 7/2012 | Aldrich et al. |
| 8,226,165 B2 | 7/2012 | Mizoi |
| 2004/0195870 A1 | 10/2004 | Bohlender et al. |
| 2005/0200166 A1 | 9/2005 | Noh |
| 2006/0043777 A1 | 3/2006 | Friedman et al. |
| 2007/0120401 A1 | 5/2007 | Minuth et al. |
| 2007/0241593 A1 * | 10/2007 | Woerner ............. B60N 2/4885 297/216.12 |
| 2008/0174159 A1 | 7/2008 | Kojima et al. |
| 2009/0066122 A1 | 3/2009 | Minuth et al. |
| 2009/0322124 A1 | 12/2009 | Barkow et al. |
| 2010/0038937 A1 | 2/2010 | Andersson et al. |
| 2010/0140986 A1 | 6/2010 | Sawada |
| 2010/0140992 A1 | 6/2010 | Yamaguchi |
| 2010/0187881 A1 | 7/2010 | Fujita et al. |
| 2010/0201167 A1 | 8/2010 | Wieclawski |
| 2010/0231013 A1 | 9/2010 | Schlenker |
| 2010/0270840 A1 | 10/2010 | Tanaka et al. |
| 2010/0301650 A1 | 12/2010 | Hong |
| 2010/0320816 A1 | 12/2010 | Michalak |
| 2011/0018498 A1 | 1/2011 | Soar |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0254335 A1 | 10/2011 | Pradier et al. |

(56) References Cited

U.S. PATENT DOCUMENTS

| | | |
|---|---|---|
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0285194 A1 | 11/2011 | Marom |
| 2011/0298261 A1 | 12/2011 | Holt et al. |
| 2012/0041648 A1 | 2/2012 | Yamaguchi et al. |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |

FOREIGN PATENT DOCUMENTS

| | | |
|---|---|---|
| EP | 0926969 | 1/2002 |
| EP | 1266794 | 3/2004 |
| EP | 1123834 | 10/2004 |
| EP | 1002693 | 9/2005 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| KR | 20100019390 | 2/2010 |
| WO | WO9511818 | 5/1995 |
| WO | WO9958022 | 11/1999 |
| WO | WO2006131189 | 12/2006 |
| WO | WO2007028015 | 8/2007 |
| WO | WO2008073285 | 6/2008 |
| WO | WO2011021952 | 2/2011 |
| WO | WO2012008904 | 1/2012 |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergo-nomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

eCOUSTICS.com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

SAE International. "Capacitive Sensors Increase Safety, Comfort." (http://www.sae.org/automag/technewsletter/071106Electronics/04.htm), Jun. 13, 2013, 3 pages.

\* cited by examiner

US 9,315,130 B2

ARTICULATING HEAD RESTRAINT

FIELD OF THE INVENTION

The present invention generally relates to a vehicle head restraint, and more particularly to an articulating head restraint for a vehicle seatback.

BACKGROUND OF THE INVENTION

It is common for seating assemblies in vehicles to include a head restraint for supporting the head of a seated occupant. To provide an appropriate contact surface for the seated occupant's head, in some instances, these head restraints may be configured to linearly adjust upward and downward by sliding notched support posts within apertures on the associated seatback. However, head restraints frequently lack adequate adjustment features for different sized occupants and various seating positions in the respective seating assembly.

SUMMARY OF THE INVENTION

According to one aspect of the present invention, an articulating head restraint for a vehicle seatback includes front and rear links that are configured to pivotally couple with an upper portion of the vehicle seatback. A member is pivotally coupled with the front and rear links to define a four-bar linkage and is movable between fore and aft positions. A cushion is slidably coupled with a face portion of the member and movable between upper and lower positions.

According to another aspect of the present invention, a vehicle head restraint includes a base bracket configured to engage a seatback. Front and rear links have lower ends pivotally coupled with respective forward and rearward portions of the base bracket. A member is pivotally coupled with upper ends of the front and rear links and movable with the front and rear links between fore and aft positions. A cushion is slidably coupled with the member and is adjustable between upper and lower positions.

According to yet another aspect of the present invention, a vehicle head restraint includes a four-bar linkage that has a bottom link that is configured to engage a seatback. A head support member is coupled with a top link of the four-bar linkage. A cushion is slidably coupled with the head support member and is slidable between upper and lower positions. An actuator is coupled between two links of the four-bar linkage. The actuator is adjustable between first and second lengths for moving the cushion between fore and aft positions.

According to another aspect of the present invention, an articulating head restraint includes a base bracket with support posts that are configured to easily engage a seatback during vehicle assembly and to provide an electrical connection for adjustment actuation. Front and rear links have lower ends pivotally coupled with respective forward and rearward portions of the base bracket. A member is pivotally coupled with upper ends of the front and rear links and movable with the front and rear links between fore and aft positions. A cushion is slidably coupled with the member and is adjustable between upper and lower positions. First and second actuators are contained within the head restraint and may be operated independently to adjust the cushion between various combinations of the fore and aft positions and the upper and lower positions to provide placement of the cushion in an orientation that accommodates the seated occupant.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
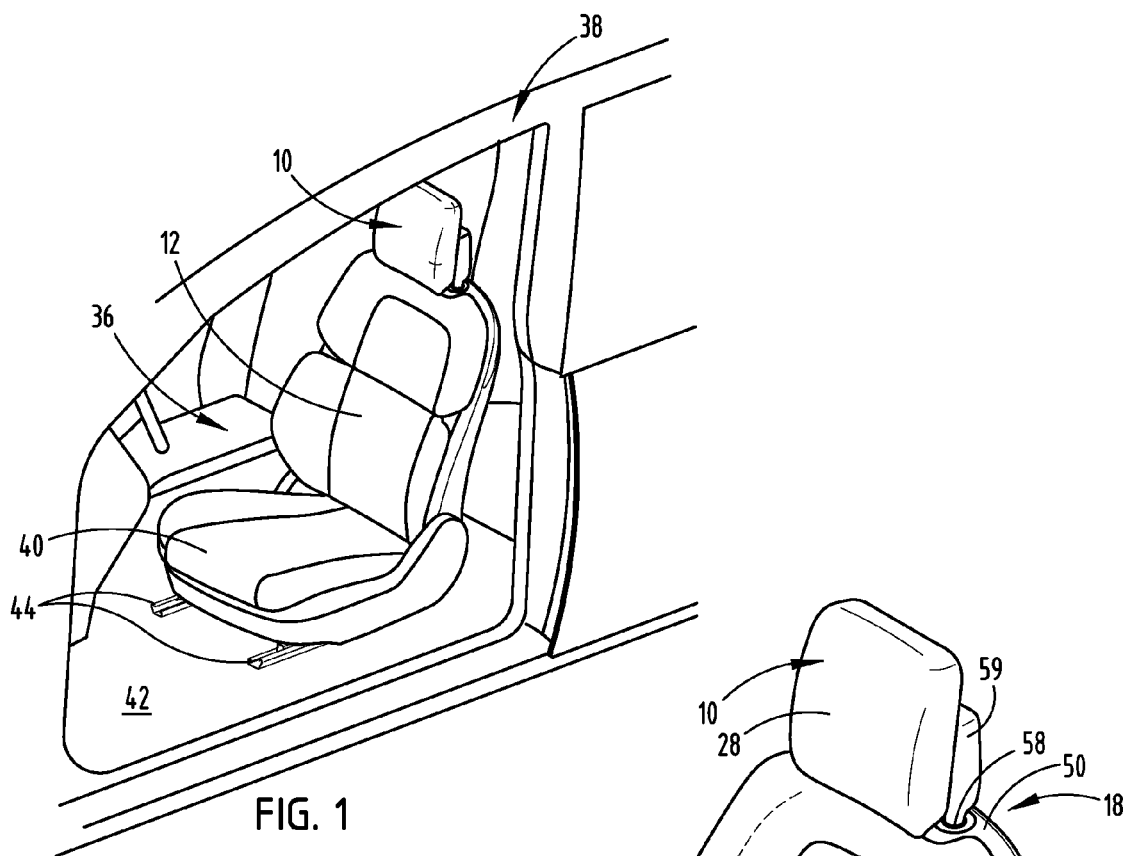
FIG. 1 is a top perspective view of a vehicle seating assembly in a vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-13, reference numeral 10 generally designates a head restraint 10 that engages a vehicle seatback 12. The head restraint 10 includes a front link 14 and a rear link 16 that pivotally couple with an upper portion 18 of the seatback 12. A head support member 20 is pivotally coupled with the front and rear links 14, 16 to define a four-bar linkage 22. The head support member 20 is moveable between fore and aft positions 24, 26 via the front and rear links 14, 16. A cushion 28 is slidably coupled with a face portion 30 of the head support member 20 and is thereby moveable between upper 32 and lower 34 positions.

Referring now to FIG. 1, one embodiment of the head restraint 10 is shown coupled with the seatback 12 of a vehicle seating assembly 36. The vehicle seating assembly 36 is positioned in a front driver side location of a vehicle 38. It is understood that the vehicle seating assembly 36 may be positioned in various positions throughout the vehicle 38 other than the illustrated position, such as the passenger side location, a mid-row location, and a rear seat location. The vehicle seating assembly 36 includes the seatback 12 that is pivotally coupled with a seat base 40 to provide reclining functionality to the seating assembly 36. The seat base 40 is slidably coupled with a floor 42 of the vehicle 38 about a track system 44 to permit forward and rearward linear adjustment of the vehicle seating assembly 36 relative to the floor 42 of the vehicle 38. It is also conceivable that the seat base 40 may not include the track system 44 and alternatively may be fixedly coupled with the floor 42 of the vehicle 38.

Figure 2:
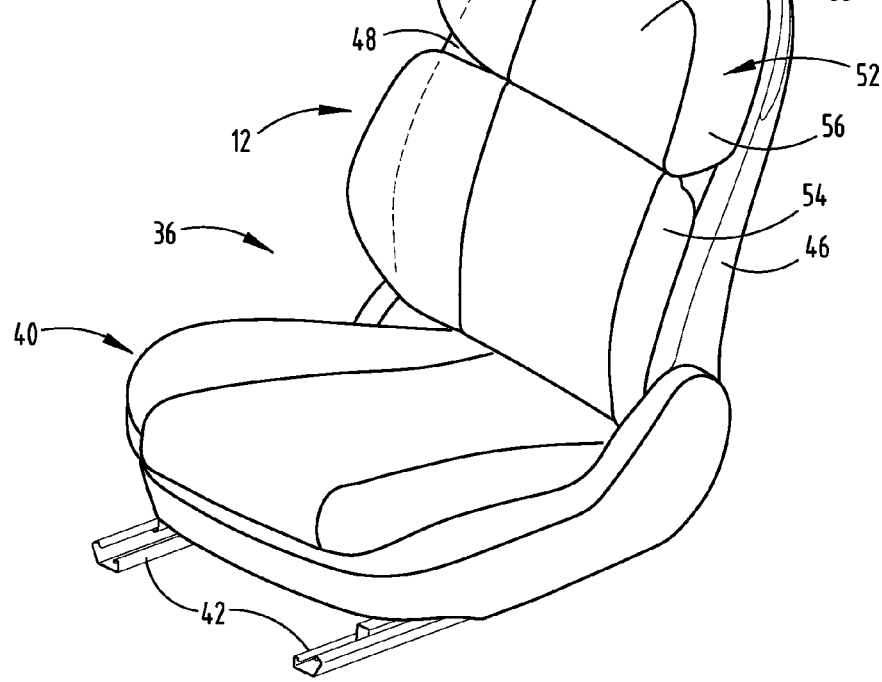
FIG. 2 is a top perspective view of the vehicle seating assembly having an articulating head restraint, according to one embodiment of the present invention.

As illustrated in FIG. 2, the seatback 12 of the vehicle seating assembly 36 has a frame that includes a first side support 46 and a second side support 48 that each extends upward from the seat base 40 to couple with a top support 50, which extends generally orthogonally between the first and second side supports 46, 48. A back support cushion 52 is disposed between the first and second side supports 46, 48 to define a back support surface 53 that extends between the seat base 40 and the top support 50. In the illustrated embodiment, the back support cushion 52 is divided into a lower cushion part 54 and an upper cushion part 56, which in some embodiments may pivot forward relative to the lower cushion part 54 to adjust the contour of the back support surface 53. It is contemplated that the back support cushion 52 and other portions of the seatback 12 may be alternatively configured in additional embodiments, such as incorporating or further separating the back support cushion 52 or portions thereof from the seatback frame or alternatively arranging the back support cushions 52 thereon.

As also shown in FIG. 2, the head restraint 10 couples with the upper portion 18 of the vehicle seatback 12 to securely support the head restraint 10 with respect to the vehicle seating assembly 36. More specifically, the seatback 12 includes a pair of apertures 58 that extend downward in a tubular shape into the top support 50 of the frame for receiving and securing the support posts 60 (FIG. 3) of the articulating head restraint 10, as explained in more detail below. The articulating head restraint 10 is orientated on the seatback 12 to extend substantially upright from the upper portion 18 of the seatback 12. A trim enclosure 59 is provided on the rear area of the head restraint 10 to substantially conceal the four-bar linkage 22 (FIG. 4), electrical actuation motors, and other components of the head restraint 10. It is generally understood that the head restraint 10 in additional embodiments may couple differently with the upper portion 18 of the seatback 12, including portions of the back support cushion 52, to provide adequate support to the articulating head restraint 10.

Figure 3:
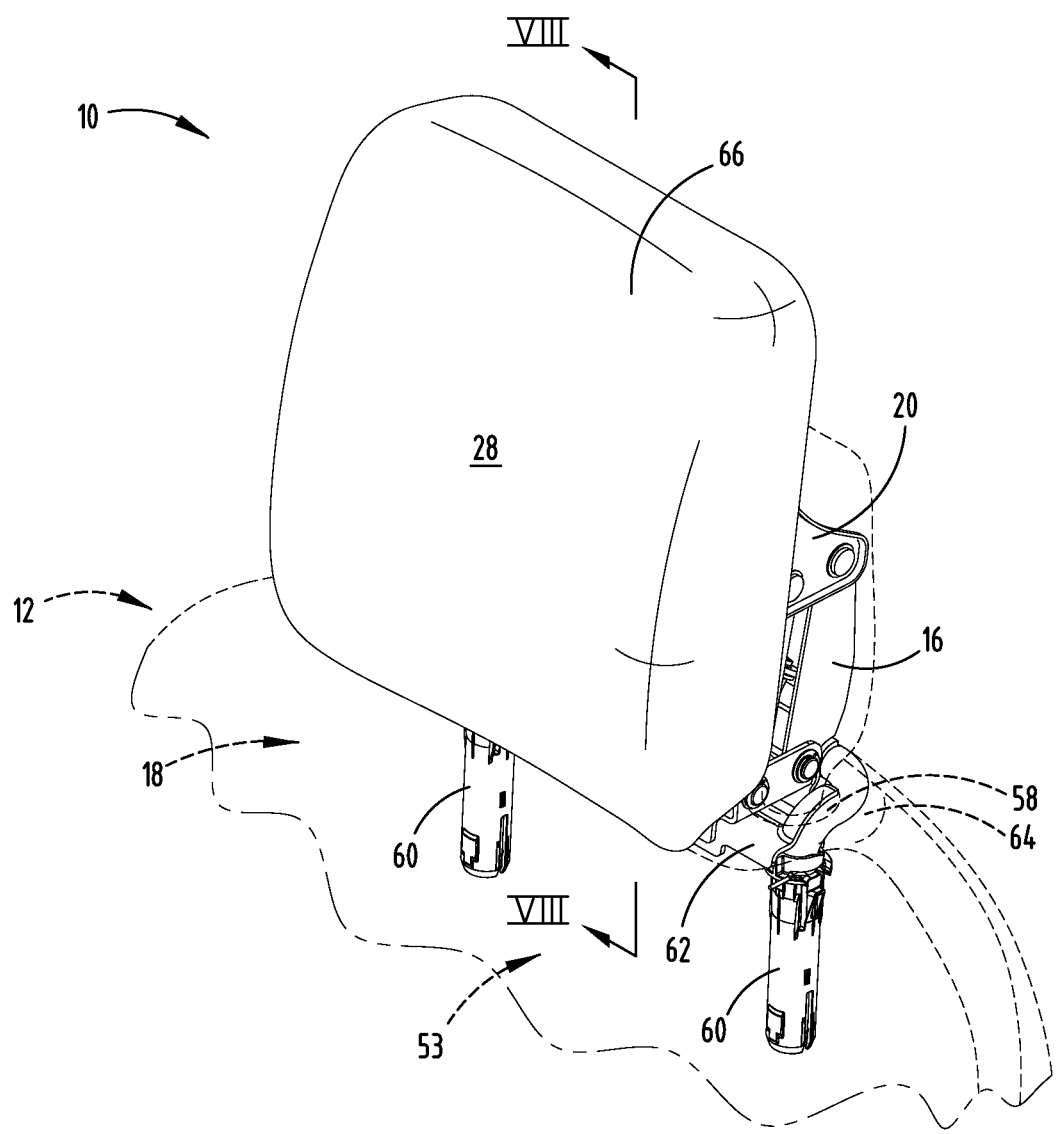
FIG. 3 is a front top perspective view of the articulating head restraint having a rear trim enclosure removed for exposing a four-bar linkage thereof.

With reference to FIG. 3, the pair of support posts 60 are shown extending down from a base bracket 62 to slidably and removably engage the apertures 58 in the seatback 12 and thereby provide easier installation of the head restraint 10 onto the seatback 12, such as after assembly installation of the seatback 12 into the vehicle 38. The slidable installation also allows for the seatback 12 to be fitted with either the articulating head restraint 10 described herein or a traditional non-articulating head restraint, as generally understood by one having ordinary skill in the art. The base bracket 62 in the illustrated embodiment extends along in abutting contact with a top surface 64 of the seatback 12 between the pair of support posts 60. The support posts 60 are thereby fixedly coupled the base bracket 62 to thereby secure the base bracket 62 with the upper portion 18 of the seatback 12. Accordingly, it is conceivable that in additional embodiments the base bracket 62 may be alternatively attached to the upper portion 18 of the seatback 12 or integrally formed with the top surface 64 thereof, although customization and installation advantages of the easily removable support posts 60 may be compromised with such integration of the base bracket 62. The base bracket 62, in the illustrated embodiment, furthermore defines a bottom link of the four-bar linkage 22 that is configured to engage the top surface 64 of the seatback 12. As shown, the base bracket 62 is attached to the seatback 12 to centrally position the head restraint 10 on the seatback 12 and to generally align a head support surface 66 of the cushion 28 in generally parallel alignment with the back support surface 53 of the seatback 12, as also illustrated in FIG. 6.

Figure 4:
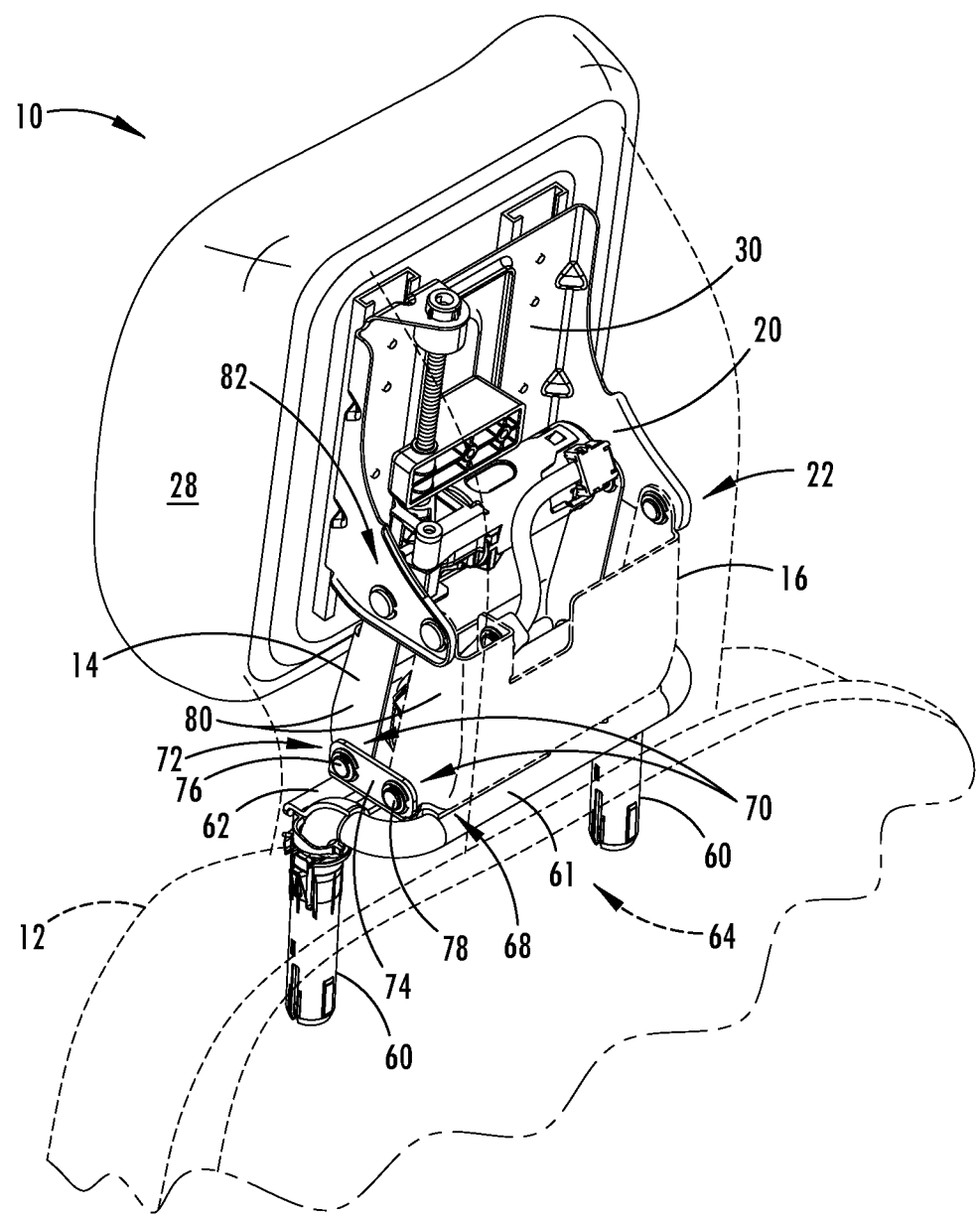
FIG. 4 is a rear top perspective view of the articulating head restraint shown in FIG. 3.

As further illustrated in FIG. 4, the support posts 60 are shown as a single integral tube that includes a horizontal portion 61 extending beneath a rearward portion 68 of the base bracket 62 and across the top surface 64 of the seatback 12. However, it is understood that the support posts 60 in additional embodiments may be individual pieces that separately attach to the base bracket 62. The lower ends 70 of the front and rear links 14, 16 are pivotally coupled respectively with a forward portion 72 and the rearward portion 68 of the base bracket 62. More specifically, the base bracket 62 includes outer flanges 74 that extend upward proximate the lateral ends of the base bracket 62. The forward portion 72 of the base bracket 62 includes a forward rotational axis 76 that extends laterally across the base bracket 62 and through the outwardly extending flanges 74 proximate the connection with the front link 14 for pivoting the front link 14 relative to the base bracket 62. Similarly, the outwardly extending flanges 74 include a rearward rotational axis 78 proximate the connection with the rear link 16 for pivoting the rear link 16 relative to the base bracket 62. The upper ends 80 of the front and rear links 14, 16 similarly attach to the head support member 20 at separately located pivotal connections on a lower portion 82 the head support member 20 to define the four-bar linkage 22. In the illustrated embodiment, the front and rear links 14, 16 each are single pieces that span laterally across the base bracket 62 to couple between the outwardly extending flanges 74. However, it is contemplated that the front and rear links 14, 16 may be separated into additional pieces, such that a separate link may couple with each outwardly extending flange 74 or other portion of the base bracket 62 and the head support member 20, while maintaining a four-bar linkage 22 arrangement.

Figure 5:
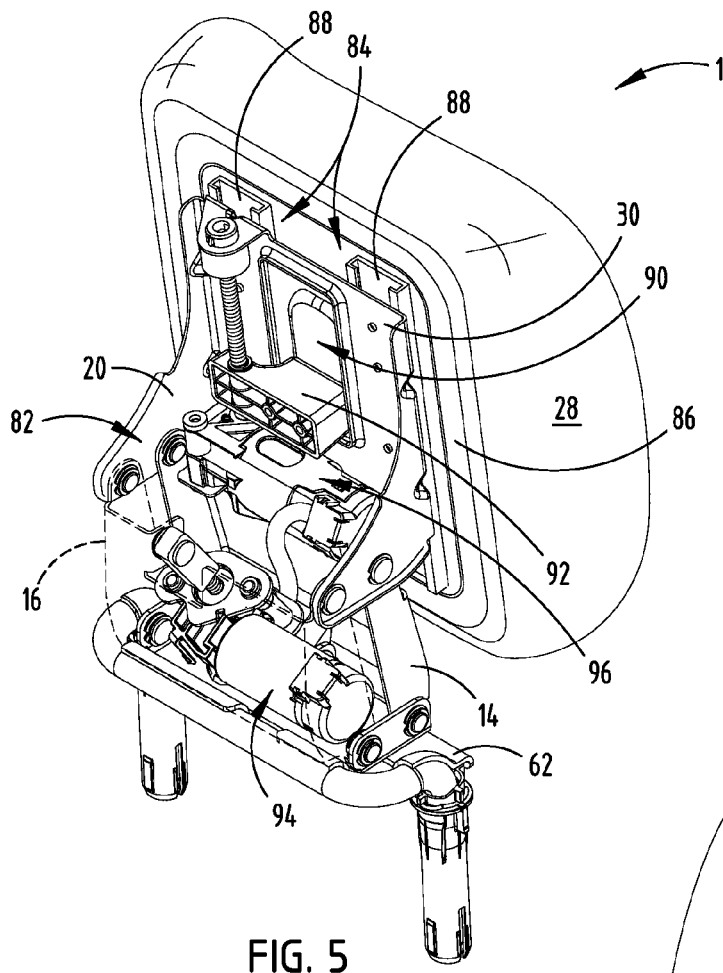
FIG. 5 is a rear top perspective view from an opposing side of the articulating head restraint from the side shown in FIG. 4, illustrating a rear link in dashed lines for exposing a first actuator.
Figure 12:
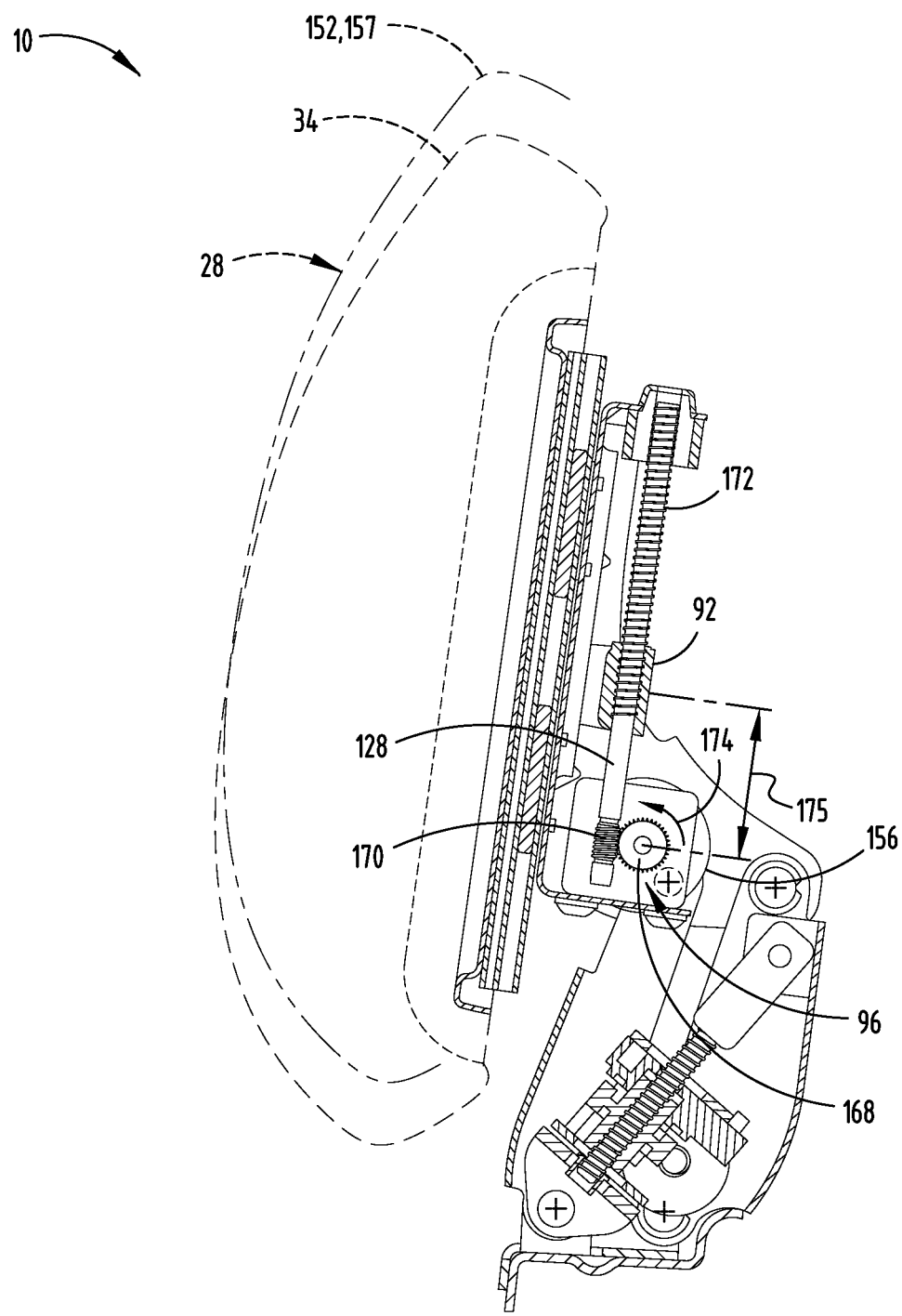
FIG. 12 is a schematic cross-sectional side view of the articulating head restraint, showing the second actuator adjusting the cushion downward to a lowered position.
Figure 13:
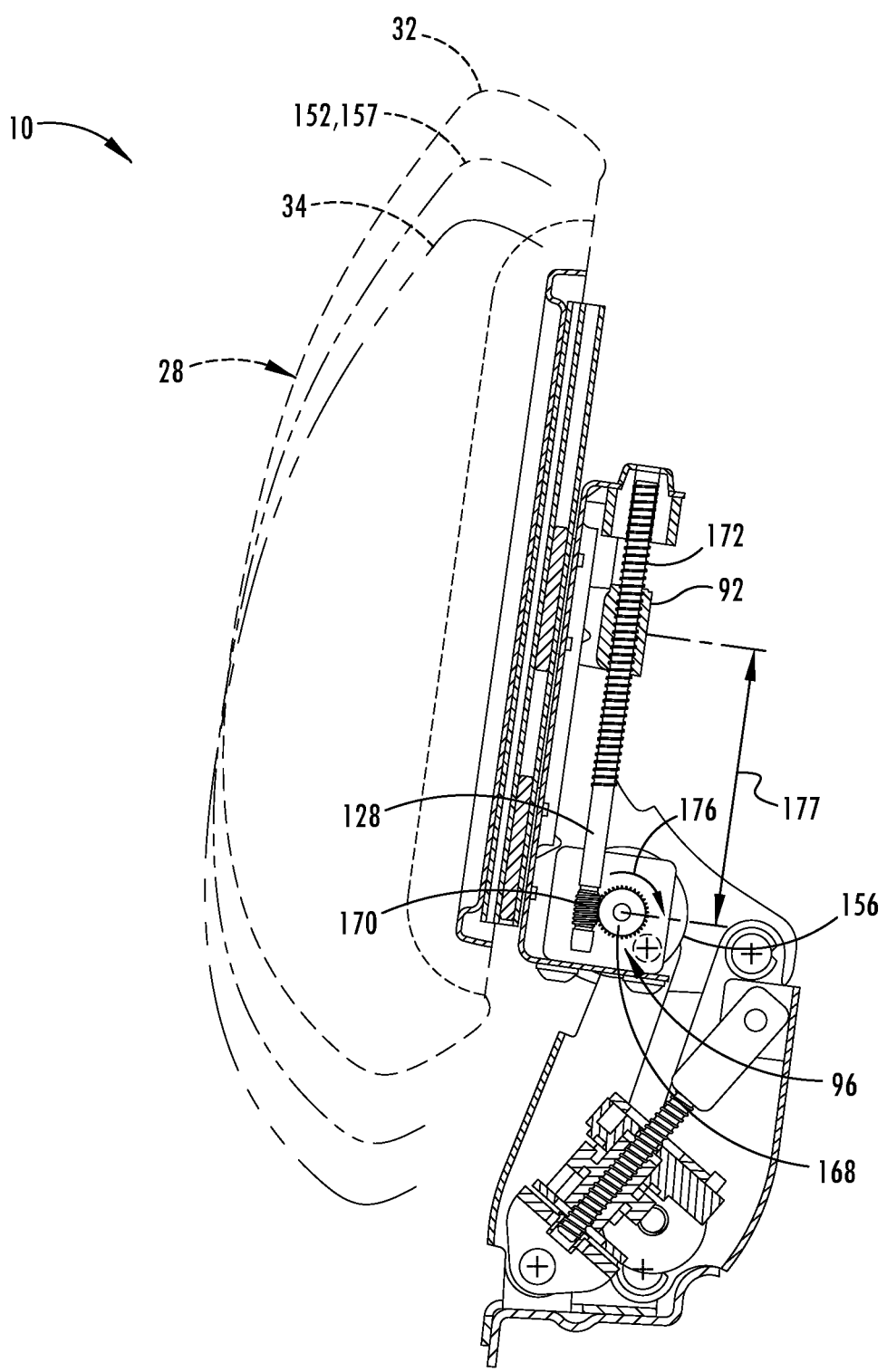
FIG. 13 is a schematic cross-sectional side view of the articulating head restraint, having the second actuator adjusting the cushion upward to a raised position.

As illustrated in FIG. 5, the face portion 30 of the head support member 20 is generally perpendicular to the lower portion 82 that couples with the front and rear links 14, 16. The face portion 30 slidably couples with the cushion 28 of the head restraint 10. In the illustrated embodiment, a track assembly 84 is coupled between the face portion 30 of the head support member 20 and a rear portion 86 of the cushion 28 to provide the slidable movement of the cushion 28 relative to the head support member 20. The track assembly 84 includes a pair of vertical tracks 88 that extend between the head support member 20 and the cushion 28 on opposing sides of an opening 90 on the face portion 30 of the head support member 20 that is configured to receive an articulation arm 92, which projects rearward from the cushion 28 and is vertically slidable in the opening 90. A first actuator 94 is coupled between the base bracket 62 and the rear link 16 for moving the head support member 20 between the fore and aft positions 24, 26. Also, a second actuator 96 is coupled between the articulation arm 92 of the cushion 28 and the head support member 20 for moving the cushion 28 between the upper and lower positions 32, 34 (FIGS. 12-13).

Figure 6:
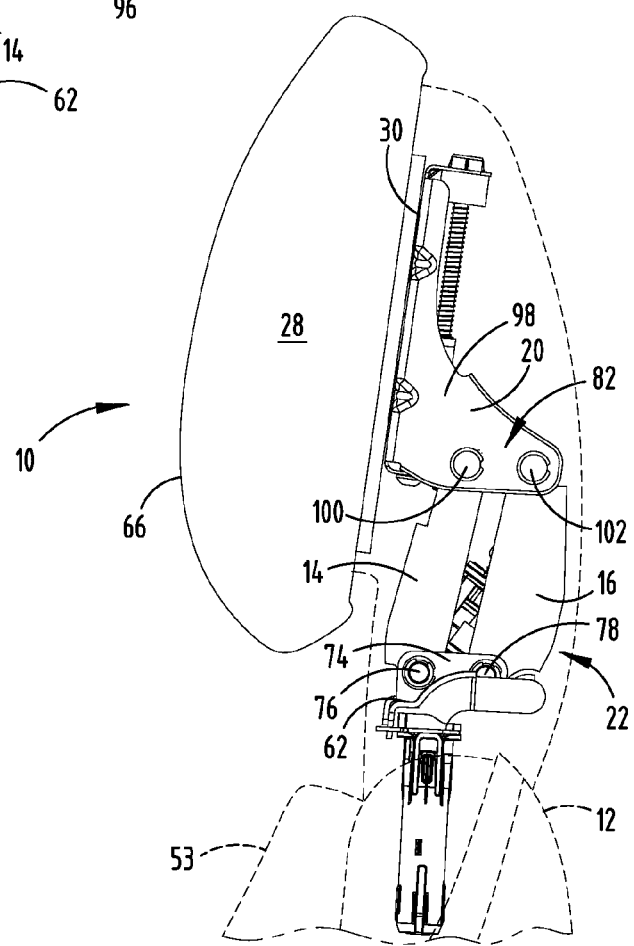
FIG. 6 is a side elevational view of the articulating head restraint.

As shown in FIG. 6, the head support member 20 has generally L-shaped rear flanges 98 that extend rearward from the lateral edges of the face portion 30 of the head support member 20. The bottom ends of the rear flanges 98 define the lower portion 82 of the head support member 20 that pivotally couple with the front and rear links 14, 16. More specifically, the lower portion 82 of the head support member 20 includes a front rotational axis 100 that extends laterally through the rear flanges 98 proximate the connection with the front link 14 for pivoting the front link 14 relative to the head support member 20. Likewise, the rear flanges 98 include a rear rotational axis 102 that extends laterally through the rear flanges 98 proximate the connection with the rear link 16 for pivoting the rear link 16. Accordingly, in the illustrated embodiment, the rear flanges 98 align with the outer flanges 74 of the base bracket 62, such that the front and rear links 14, 16 each couple with an inside surface of both the outer flanges 74 and the rear flanges 98. It is conceivable that the front or rear link 14, 16 may couple with an outside surface of the rear flanges 98 or the outer flanges 74 to provide a comparable four-bar linkage 22 arrangement.

Figure 7:
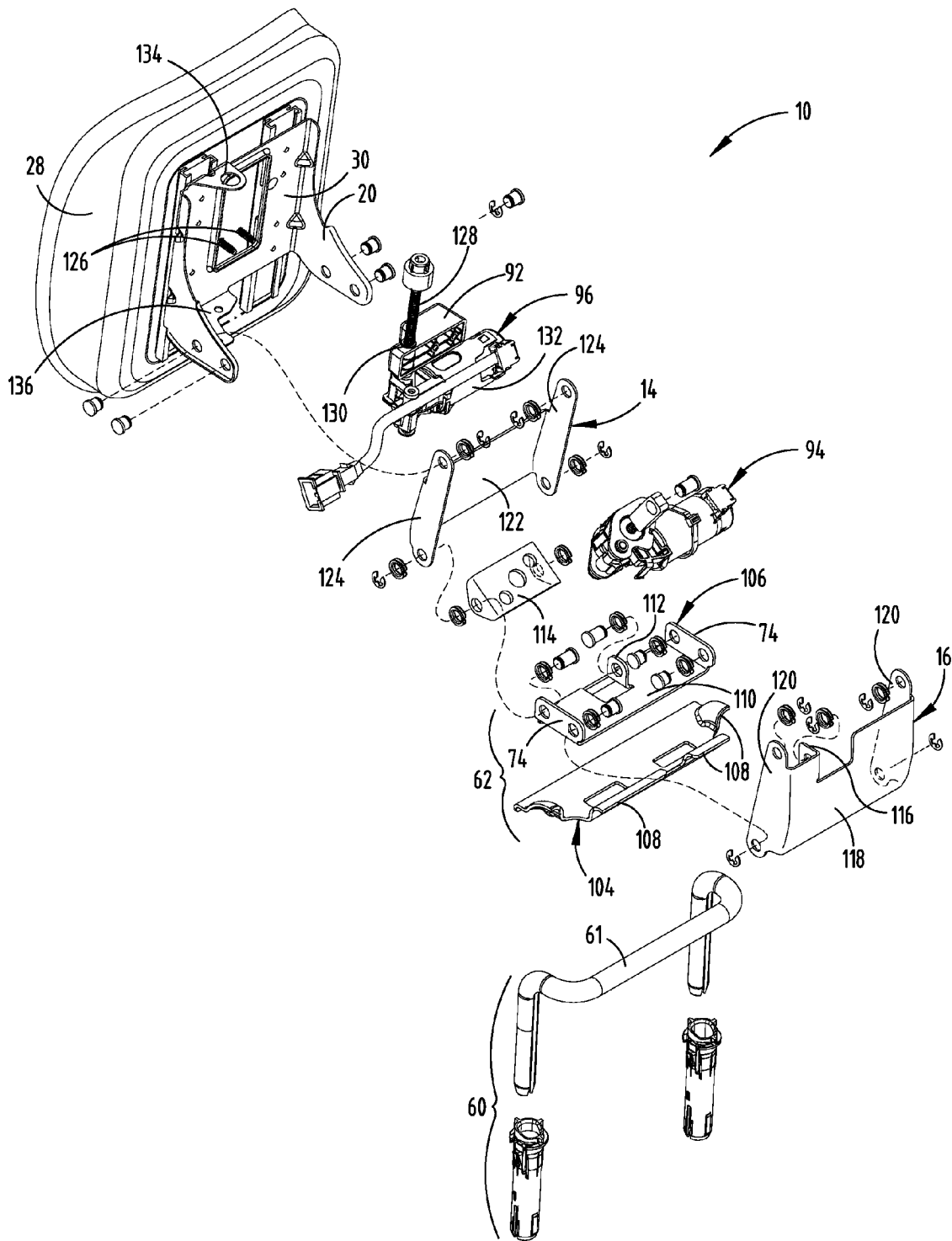
FIG. 7 is an exploded rear top perspective view of the articulating head restraint, showing the actuators, the four-bar linkage, and other portions of the articulating head restraint.

Referring now to FIG. 7, the support posts 60 include sleeve members that generally surround the vertical portions of the support posts 60 and are fitted into the apertures 58 on the seatback 12 (FIG. 3). In additional embodiments, the support posts 60 or sleeve members may include a male or female connector and the top support 50 of the seatback 12 (FIG. 2) may include a female or male connector that engages the corresponding connector on at least one of the support posts 60 upon attachment of the head restraint 10 to provide an electrical connection to supply electrical power and data communication from the seatback 12 to the first and second actuators 94, 96 of the head restraint 12. The base bracket 62 includes a bottom part 104 and a top part 106 that interconnect to provide the connection between the horizontal portion 61 of the support posts 60 and the front and rear links 14, 16. The bottom part 104 is formed to include retention features 108 that secure to the horizontal portion 61 of the support posts 60, whereby the retention features 108 have a curved shaped that corresponds to the outer surface of the tubular shaped support posts 60. The top part 106 of the base bracket 62 has a substantially planar body portion 110 with the outer flanges 74 extending vertically at the lateral ends thereof. In addition, the top part 106 of the base bracket 62 includes a central tab 112 that similarly extends upright in general alignment with the outer flanges 74. In the illustrated embodiment, the central tab 112 is formed from cutting a U-shape into the horizontal surface of the body portion 110 and bending the U-shape tab upright to a generally vertical orientation.

Figure 10:
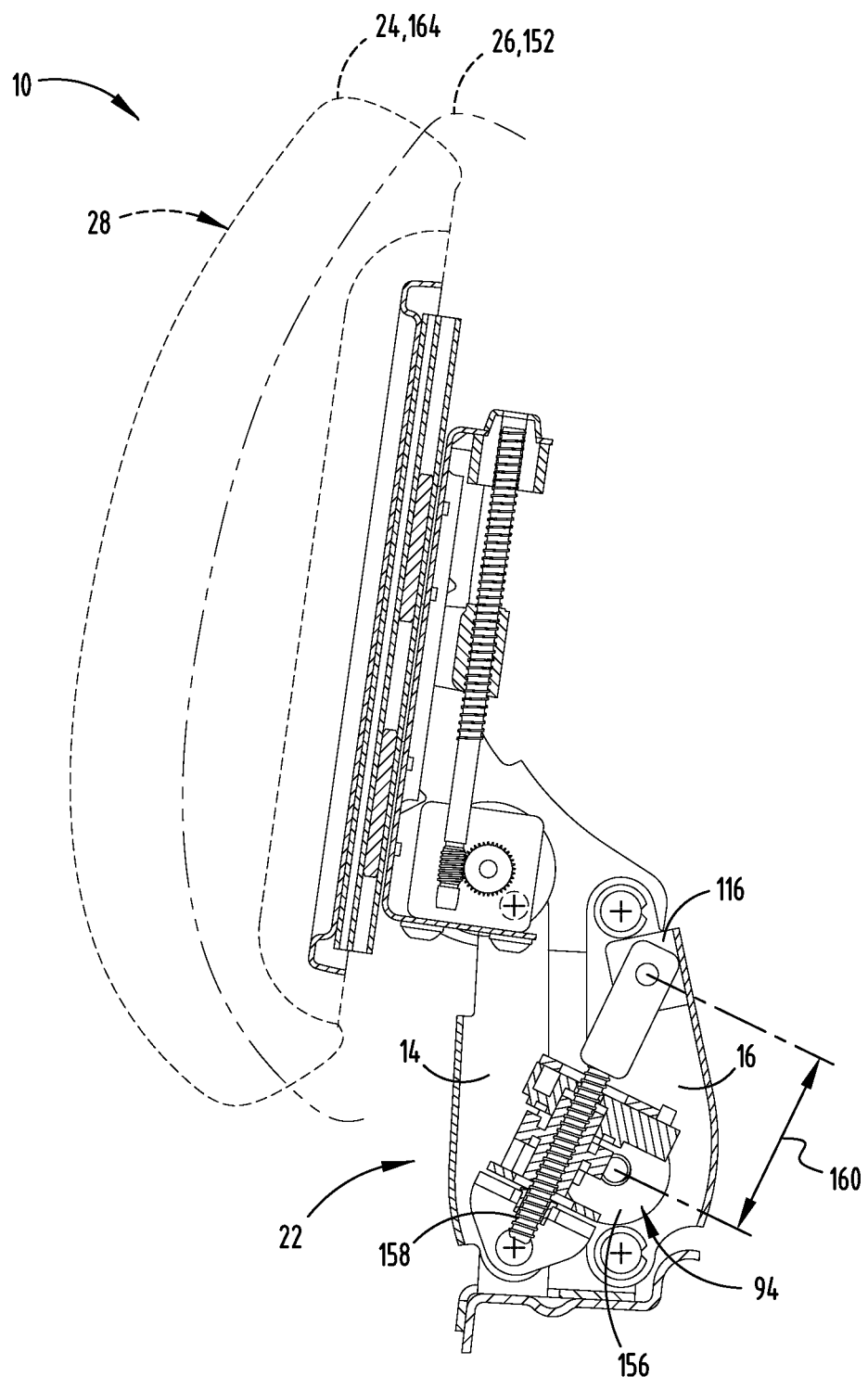
FIG. 10 is a schematic cross-sectional side view of the articulating head restraint, showing the first actuator moved to a first shorter length adjusting the cushion forward.
Figure 11:
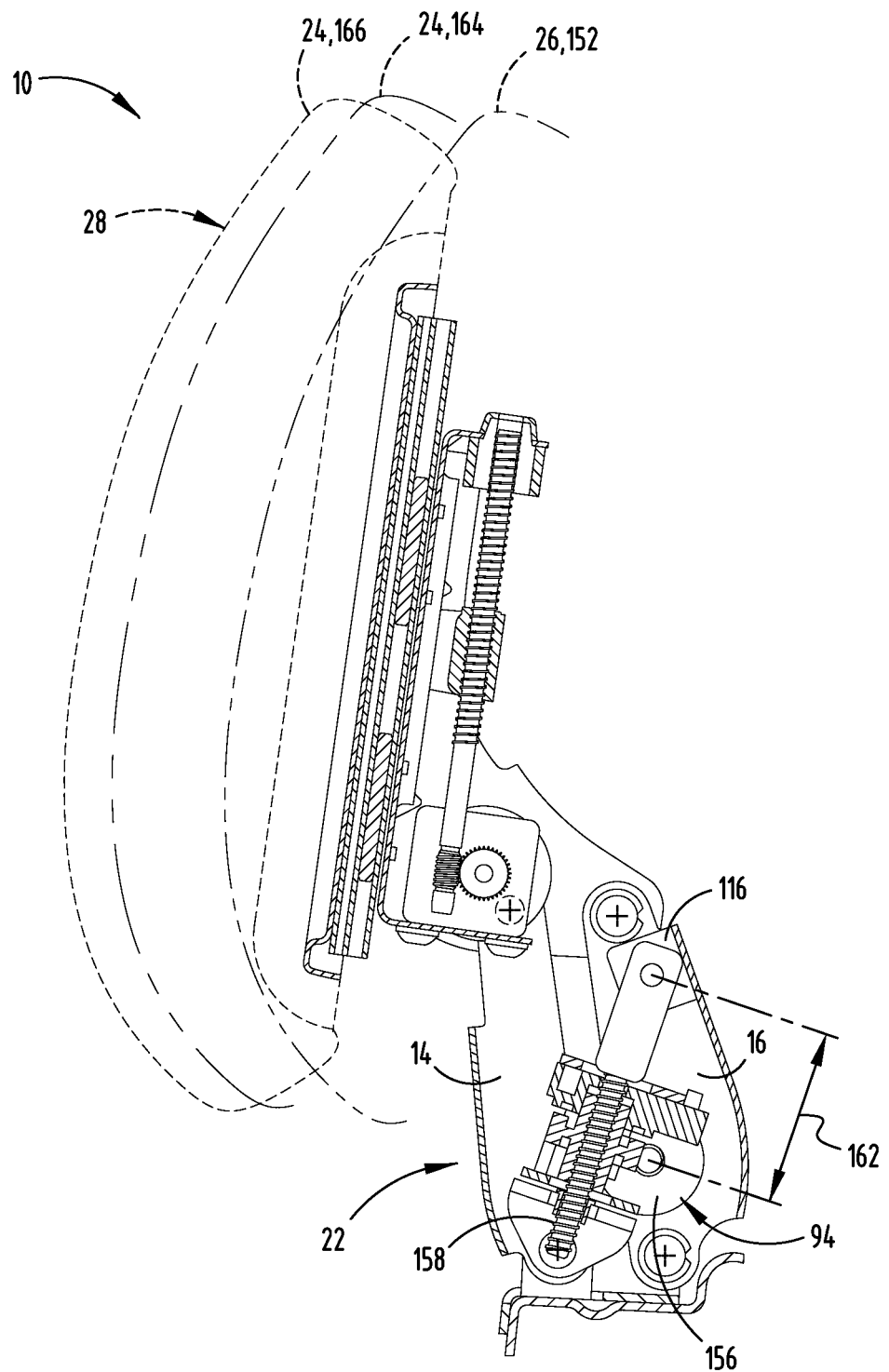
FIG. 11 is a schematic cross-sectional side view of the articulating head restraint, showing the first actuator moved to a second shorter length adjusting the cushion forward.

As also illustrated in FIG. 7, a motor mount 114 is pivotally coupled between the central tab 112 and one of the outer flanges 74 in coaxial alignment with the forward rotational axis 76. The motor mount 114 includes attachment holes on a platform thereof for attachment fasteners to secure the first actuator 94 thereto. The first actuator 94 is coupled between the motor mount 114 and the upper end of the rear link 16. More specifically, the upper end of the rear link 16 includes an attachment tab 116 that extends forward from a central portion 118 of the rear link 16. The central portion 118 of the rear link 16 extends laterally between linkage members 120 of the rear link 16 that similarly extend forward from outer ends of the central portion 118 in vertical and longitudinal alignment with the outer flanges 74 of the base bracket 62 for pivotally coupling therewith. The front link 14 has a similar construction to the rear link 16 in that a central portion 122 of the front link 14 extends laterally between linkage members 124 that extend rearward from outer ends thereof. The central portions 118, 122 of the front link 14 and the rear link 16 substantially enclose the first actuator 94 and define an articulating neck of the head restraint 10. It is also conceivable that the first actuator 94 may be configured to extend between the rearward rotational axis 78 (FIG. 6) and the upper end of the front link 14 to provide similar actuation of the four-bar linkage 22 between fore and aft positions 24, 26 (FIGS. 10-11).

Still referring to FIG. 7, the second linear actuator 96 couples between the cushion 28 and the head support member 20 to move the cushion 28 between the upper and lower positions 32, 34 (FIGS. 12-13). The cushion 28 generally includes a pair of fasteners 126 that extend rearward for coupling with the articulation arm 92 of the second linear actuator 96. The articulation arm 92 threadably engages a rotatable shaft 128 of the second actuator 96 that has threads on an outer surface thereof for operably engaging a threaded aperture 130 of the articulation arm 92. The rotatable shaft 128 extends upward from an electric motor 132 of the second actuator 96 to engage an upper mounting flange 134 that extends rearward from a top end of the face portion 30 of the head support member 20. The electric motor 132 of the second actuator 96 mounts to a lower mounting flange 136 that extends rearward from a bottom end of the face portion 30 of the head support member 20. It is conceivable that the second actuator 96 may be alternatively arranged between the cushion 28 and the head support member 20 to provide similar vertical adjustment of the cushion 28 between the upper and lower positions 32, 34 (FIGS. 12-13).

Figure 7A:
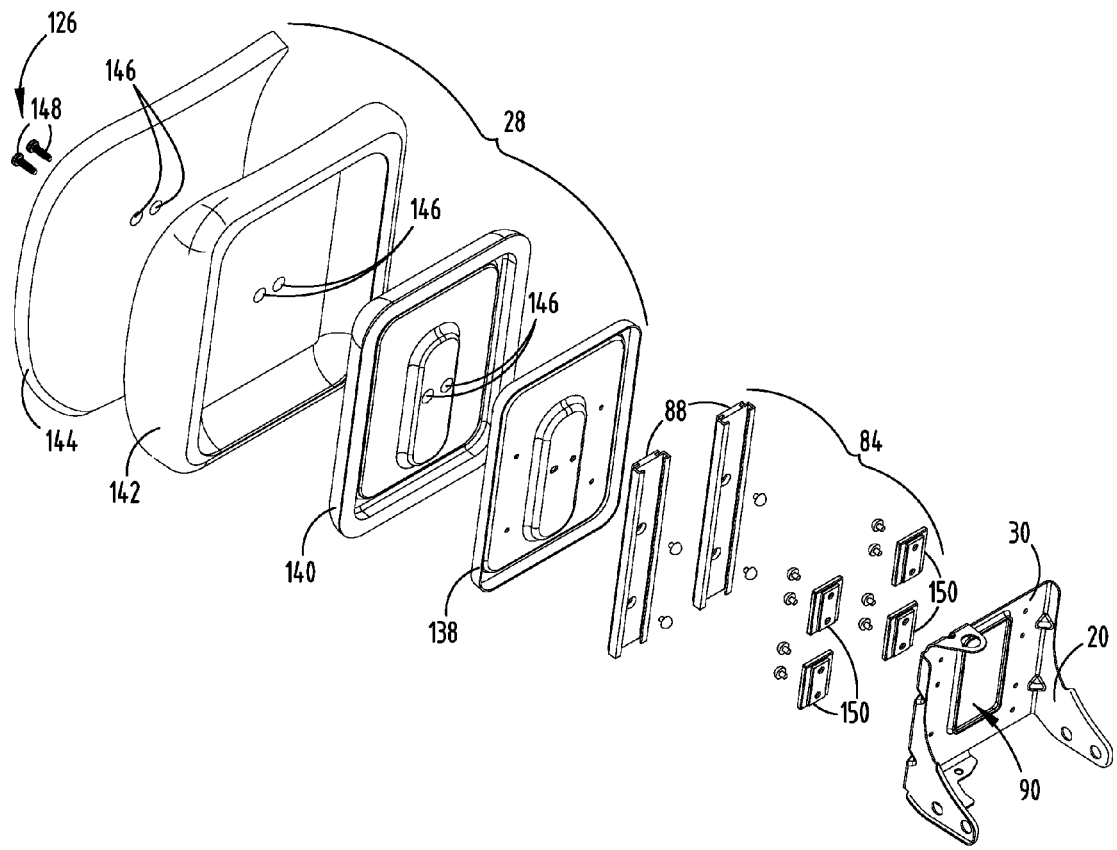
FIG. 7A is an exploded rear top perspective view of a head support member, a track assembly, and a cushion of the articulating head restraint.
Figure 8:
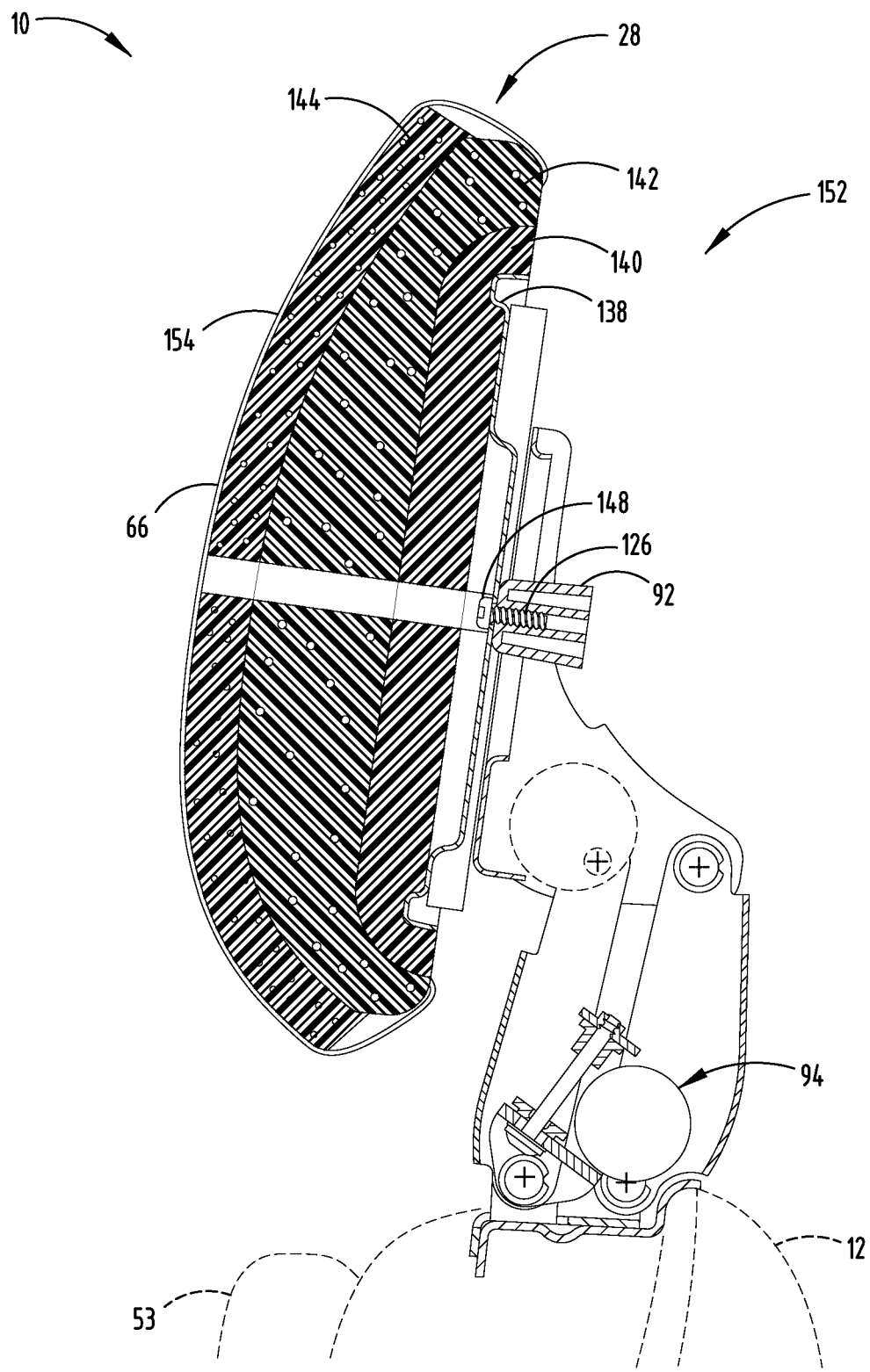
FIG. 8 is a cross-sectional side view of the articulating head restraint, taken at line VIII-VIII of FIG. 3.

As shown in more detail in FIG. 7A, the cushion 28 includes a rigid backing panel 138 that retains a first layered cushion part 140, a second layered cushion part 142, and a third layered cushion part 144 that may each be made of a foam material, a resilient woven material, or other flexible cushion materials and combinations thereof as generally understood by one having ordinary skill in the art. It is contemplated that the layered cushion parts may be integrated in fewer parts or a single cushion part or may also include additional or alternatively configured cushion parts. A pair of apertures 146 extend coaxially through the first, second, and third layered cushion parts 140, 142, 144 and are sized with a diameter greater than heads 148 of the pair of fasteners 126 that extend rearward from the cushion 28. The heads 148 are retained by the forward facing surface of the backing panel 138, as shown in FIG. 8, and the threaded portion of the attachment fasteners 126 extend through the backing panel 138 to engage the articulation arm 92 of the second actuator 96. The pair of tracks 88 of the track assembly 84 couple with a rearward surface of the backing panel 138 on opposing sides of the pair of fasteners 126. The pair of tracks 88 slidably couple with sliding elements 150 of the track assembly 84 that are fixedly coupled with the face portion 30 of head support member 20 on opposing sides of the opening 90. In the illustrated embodiment, four separate sliding elements 150 with a generally T-shape cross section are included; however, more, fewer, and alternatively shaped sliding elements 150 may be included in additional embodiments of the track assembly 84. Furthermore, the track assembly 84 may be alternatively configured with the tracks 88 fixedly coupled with the head support member 20 and the sliding elements 150 fixedly coupled with the backing panel 138 of the cushion 28. In addition, the track assembly 84 may otherwise be integrated in additional embodiments with portions of the cushion 28, such as the backing panel 138, or portions of the head support member 20.

Figure 9:
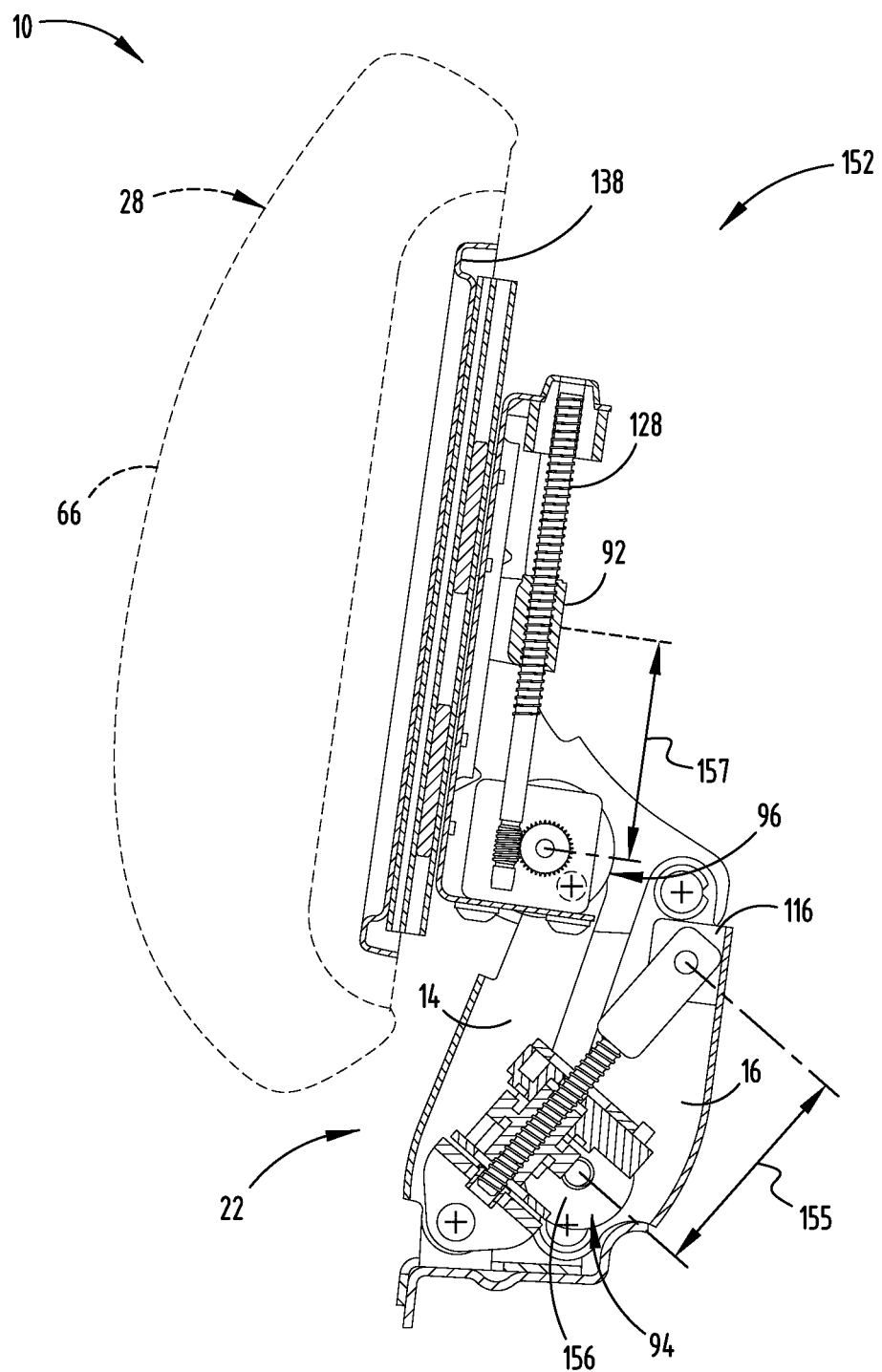
FIG. 9 is a schematic cross-sectional side view of the articulating head restraint, showing the first actuator and a second actuator positioning the cushion in a neutral position.

As shown in FIGS. 8 and 9, the head restraint 10 is oriented in a neutral position 152. More specifically, in the neutral position 152 the head support surface 66 of the cushion 28 is generally aligned longitudinally with the back support surface 53 of the seatback 12. The head support surface 66 is generally defined by an exterior surface of a cover stock material 154 that surrounds the layered cushion parts 140, 142, 144 of the cushion 28 and is comprised of a durable fabric material, such as leather, woven fabric, vinyl, or other upholstery materials as generally understood by one having ordinary skill in the art. The longitudinal position of the cushion 28 is generally controlled by the first actuator 94, which is positioned at a first length 155 with the head restraint 10 in the neutral position 152. The vertical position of the cushion 28 is generally controlled by the second actuator 96, having the articulation arm 92 in a central position 157 relative to the rotatable shaft 128 of the second actuator 96 when the head restraint 10 is in the neutral position 152.

Referring now to FIGS. 10 and 11, operation of the head restraint 10 between various fore and aft positions 24, 26 is controlled by linear adjustment of the first actuator 94. The first actuator 94 also includes an electric motor 156 that is interfaced with a worm gear 158 that extends upward from the electric motor 156 to pivotally couple with the attachment tab 116 of the rear link 16. Actuation of the electric motor 156 rotates a drive that linearly adjusts the worm gear 158 from the first length 155 to a second length 160 (FIG. 10) and to a shorter third length 162 (FIG. 11) and any intermediate position therebetween. It is also understood that in additional embodiments the first actuator 94 may be configured to move to a length shorter than the third length 162 and longer than the first length. The first, second, and third lengths 155, 160, 162 of the first actuator 94 are defined between the rotational axis of the drive of the electric motor 156 and the pivotal axis formed between the end of the worm gear 158 that is rotatably coupled with the attachment tab 116 of the rear link 16. Upon movement of the first actuator 94 from the first length 155 to the shorter second length 160, the four-bar linkage 22 pivots forward to position the cushion 28 forward to a first fore position 164 relative to the aft position 26 when the head restraint 10 is in the neutral position 152. Similarly, when the first actuator 94 moves from the second length 160 to the shorter third length 162, the four-bar linkage 22 pivots forward causing the cushion 28 to move further forward from the first fore position 164 to a second fore position 166. The front and rear links 14, 16 in the illustrated embodiment have a generally equivalent length, and attach at generally equal distances from each other at the head support member 20 and the base bracket 62, resulting in a parallelogram arrangement that causes the cushion 28 to move from the aft position 26 to the first and second fore positions 164, 166 while substantially maintaining the angle and vertical orientation of the cushion 28. It is conceivable that the lengths and attachment spacing of the front and rear links 14, 16 may be adjusted in additional embodiments to otherwise alter the angle of the cushion 28 upon movement between the fore and aft positions 24, 26.

As illustrated in FIGS. 12 and 13, operation of the head restraint 10 in moving the cushion 28 between the upper and lower positions 32, 34 is controlled by adjustment of the second actuator 96. More specifically, the second actuator 96 is operated to move the articulation arm 92 from the central position 157 to a lower position 34, an upper position 32, and any intermediate positions therebetween. The second actuator 96 includes the electric motor 156 that rotates a gear drive 168 that interfaces with a first threaded portion 170 of the rotatable shaft 128, whereby upon actuation of the electric motor 156 the gear drive 168 is rotated on a generally horizontal axis and interfaces with the first threaded portion 170 of the rotatable shaft 128 to rotate the rotatable shaft 128 along a generally vertical axis. Rotation of the rotatable shaft 128 moves a second threaded portion 172 of the rotatable shaft 128, which is in operable engagement with the articulation arm 92, to move the articulation arm 92 upward and downward relative to the rotatable shaft 128 and the electric motor 156. Accordingly, actuation of the electric motor 156 in a first direction 174 causes the articulation arm 92 to move downward to a lower distance 175 from the rotation axis of the gear drive 168 to place the cushion 28 in the lower position 34, as illustrated in FIG. 12. Likewise, rotation of the electric motor 156 in a second direction 176 causes the articulation arm 96 to move upward relative to the rotatable shaft 128 to a higher distance 177 from the rotational axis of the gear drive 168 to place the cushion 28 in the upper position 32, similarly displacing the head support surface 66 of the cushion 28. Again, it is contemplated that the cushion 28 may be moved by the second actuator 96 to a higher elevated position than the upper position 32 shown in the illustrated embodiment and lower than the lower position 34 shown in the illustrated embodiment. Furthermore, the rotational direction of the electric motor 156 may be reversed in additional embodiments to provide the corresponding movements of the cushion 28. With the various positions illustrated herein, it is conceivable that the first actuator 94 and the second actuator 96 may be operated independently to move the cushion 28 between various combinations of fore and aft positions 24, 26 and upper and lower positions 32, 34 to provide placement of the cushion 28 and the associated head support surface 66 in an orientation that accommodates the occupant seated and the vehicle seating assembly 36 (FIG. 2).

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An articulating head restraint for a vehicle seatback, comprising:
    a member having a face portion and a flange extending transversely therefrom;
    vertically extending front and rear links pivotably coupled with a transversely extending base bracket disposed substantially below the front and rear links and the flange substantially above the front and rear links to define a four-bar linkage movable between fore and aft positions; and
    a cushion slidably coupled with the face portion and movable between upper and lower positions along a track assembly disposed between the cushion and the face portion.

2. The articulating head restraint of claim 1, further comprising:
    a base bracket pivotally coupled with lower ends of front and rear links and configured to fixedly couple with the upper portion of the vehicle seatback.

3. The articulating head restraint of claim 2, wherein the base bracket includes at least one support post that extends down for engaging the upper portion of the vehicle seatback.

4. The articulating head restraint of claim 2, further comprising:
    a linear actuator coupled between the base bracket and an upper end of the rear link and adjustable between a first length and a shorter second length to move the member respectively between the aft position and the fore position.

5. The articulating head restraint of claim 1, wherein the track assembly includes a pair of tracks slidably coupled with a pair of sliding elements that are fixedly coupled with the face portion of the member.

6. The articulating head restraint of claim 5, further comprising:
    a linear actuator coupled between the rear portion of the cushion and the member and adjustable between a first length and a shorter second length to move the cushion respectively between the lower position and the upper position.

7. A vehicle head restraint comprising:
    a base bracket configured to engage a seatback at a fixed distance therefrom;
    car forward and car rearward links having lower ends pivotally coupled with the base bracket;
    a member disposed substantially above and pivotally coupled with upper ends of the forward and rearward links and movable with the forward and rearward links between fore and aft positions; and
    a cushion slidably coupled with the member.

8. The vehicle head restraint of claim 7, wherein the base bracket maintains a constant distance from the seatback as the cushion is slid between upper and lower positions.

9. The vehicle head restraint of claim 7, further comprising:
    a linear actuator coupled between the forward portion of the base bracket and the upper end of the rearward link for moving the member between the fore and aft positions.

10. The vehicle head restraint of claim 9, wherein the linear actuator includes an electric motor interfaced with a worm gear and configured to linearly move the worm gear for adjusting the member between the fore and aft positions.

11. The vehicle head restraint of claim 7, further comprising:
    a first linear actuator coupled between the base bracket and the rearward link for moving the member between the fore and aft positions; and
    a second linear actuator, coupled between the cushion and the member for moving the cushion between the upper and lower positions, wherein the first and second linear actuators are contained within a trim enclosure of the head restraint.

12. The vehicle head restraint of claim 7, wherein the member includes an L-shaped bracket having a face portion generally perpendicular to a lower portion, and wherein the face portion is slidably coupled with the cushion and the lower portion is pivotally coupled with the forward and rearward links.

13. The vehicle head restraint of claim 12, further comprising:
    a track assembly coupled between the face portion of the member and a rear portion of the cushion, wherein the track assembly is vertically arranged for moving the cushion between the upper and lower positions relative to the member.

14. The vehicle head restraint of claim 13, further comprising:
    a linear actuator coupled between the rear portion of the cushion and the member and adjustable between a first length and a shorter second length to move the cushion respectively between the upper position and the lower position.

15. A vehicle head restraint comprising:
    a four-bar linkage having a bottom link fixedly coupled to a seatback, a top link, and two vertically extending links disposed between the top and bottom links, wherein the top link forms a head support member;
    a cushion slidably coupled with the member and slidable along an assembly disposed above the seatback; and
    an actuator disposed between the top and the bottom link and adjustable between fore and aft positions.

16. The vehicle head restraint of claim 15, wherein the bottom link includes a base bracket pivotally coupled with lower ends of the vertically extending links and configured to fixedly couple with an upper portion of the seatback.

17. The vehicle head restraint of claim 16, wherein the actuator is coupled between the base bracket and an upper end of the rear link and adjustable between a first length and a shorter second length to move the head support member respectively between the aft position and the fore position.

18. The vehicle head restraint of claim 15, further comprising:
   a track assembly coupled between a face portion of the head support member and a rear portion of the cushion, wherein the track assembly is vertically arranged for moving the cushion between the upper and lower positions relative to the head support member.

19. The vehicle head restraint of claim 18, wherein the face portion of the head support member is generally perpendicular to a lower portion head support member, wherein the lower portion is pivotally coupled with front and rear links of the four-bar linkage.

20. The vehicle head restraint of claim 15, further comprising:
   a vertical actuator coupled between a rear portion of the cushion and the head support member and adjustable to move the cushion between the upper and lower positions.

* * * * *